US008220223B2

(12) United States Patent
Junghans

(10) Patent No.: US 8,220,223 B2
(45) Date of Patent: Jul. 17, 2012

(54) BEVERAGE BOTTLING PLANT, IN WHICH BEVERAGE BOTTLES ARE FILLED, CLOSED, PACKED, AND TRANSPORTED ON DOLLIES AND PALLETS, AN ARRANGEMENT FOR TRANSPORTING DOLLIES, AND A METHOD THEREFOR

(75) Inventor: Joachim Junghans, Frankfurt (DE)

(73) Assignee: KHS GmbH, Dortmund (DE)

( * ) Notice: Subject to any disclaimer, the term of this patent is extended or adjusted under 35 U.S.C. 154(b) by 436 days.

(21) Appl. No.: 12/616,728

(22) Filed: Nov. 11, 2009

(65) Prior Publication Data
US 2010/0121483 A1 May 13, 2010

Related U.S. Application Data

(63) Continuation-in-part of application No. PCT/EP2008/003544, filed on May 2, 2008.

(30) Foreign Application Priority Data

May 11, 2007 (DE) .................. 10 2007 022 686

(51) Int. Cl.
*B65B 57/00* (2006.01)
*B65B 7/28* (2006.01)
(52) U.S. Cl. ............................................. 53/52; 53/471

(58) Field of Classification Search ................ 53/471, 53/52, 58, 498
See application file for complete search history.

(56) References Cited

U.S. PATENT DOCUMENTS

| 2,723,770 A | 11/1955 | Gretener |
| 4,640,459 A * | 2/1987 | Hetemaa et al. ............. 238/122 |
| 4,815,916 A | 3/1989 | Beck |
| 7,802,802 B2 * | 9/2010 | Gordon ..................... 280/79.11 |

FOREIGN PATENT DOCUMENTS

| DE | 251 439 | 10/1912 |
| DE | 32 44 231 A1 | 6/1983 |
| DE | 34 42 111 C2 | 7/1986 |
| EP | 1 149 753 A2 | 10/2001 |
| JP | 2003 136905 A | 5/2003 |
| WO | WO 00/51898 A | 9/2000 |

OTHER PUBLICATIONS

English translation of Chinese Office Action 2008800014030.
International Search Report PCT/EP2008/003544 and English translation thereof.
German Search Report 10 2007 022 686.3-22.

* cited by examiner

*Primary Examiner* — Rinaldi I. Rada
*Assistant Examiner* — John Paradiso
(74) *Attorney, Agent, or Firm* — Nils H. Ljungman & Associates

(57) ABSTRACT

A beverage bottling plant, in which beverage bottles are filled, closed, packed, and transported on dollies and pallets, an arrangement for transporting dollies, and a method therefor.

18 Claims, 4 Drawing Sheets

BEVERAGE BOTTLING PLANT, IN WHICH BEVERAGE BOTTLES ARE FILLED, CLOSED, PACKED, AND TRANSPORTED ON DOLLIES AND PALLETS, AN ARRANGEMENT FOR TRANSPORTING DOLLIES, AND A METHOD THEREFOR

CONTINUING APPLICATION DATA

This application is a Continuation-In-Part application of International Patent Application No. PCT/EP2008/003544, filed on May 2, 2008, which claims priority from Federal Republic of Germany Patent Application No. 10 2007 022 686.3, filed on May 11, 2007. International Patent Application No. PCT/EP2008/003544 was pending as of the filing date of this application. The United States was an elected state in International Patent Application No. PCT/EP2008/003544.

BACKGROUND

1. Technical Field

The present application relates to a beverage bottling plant, in which beverage bottles are filled, closed, packed, and transported on dollies and pallets, an arrangement for transporting dollies, and a method therefor.

2. Background Information

Background information is for informational purposes only and does not necessarily admit that subsequently mentioned information and publications are prior art.

A beverage bottling plant for filling bottles with a liquid beverage filling material can possibly comprise a beverage filling machine, which is often a rotary filling machine, with a plurality of beverage filling positions, each beverage filling position having a beverage filling device for filling bottles with liquid beverage filling material. The filling devices may have an apparatus designed to introduce a predetermined volume of liquid beverage filling material into the interior of bottles to a substantially predetermined level of liquid beverage filling material.

Some beverage bottling plants may possibly comprise filling arrangements that receive a liquid beverage material from a toroidal or annular vessel, in which a supply of liquid beverage material is stored under pressure by a gas. The toroidal vessel may also be connected to at least one external reservoir or supply of liquid beverage material by a conduit or supply line. In some circumstances it may even be possible that a beverage bottling plant has two external supply reservoirs, each of which may be configured to store either the same liquid beverage product or different products. These reservoirs could possibly be connected to the toroidal or annular vessel by corresponding supply lines, conduits, or other arrangements. It is also possible that the external supply reservoirs could be in the form of simple storage tanks, or in the form of liquid beverage product mixers.

A wide variety of types of filling elements are used in filling machines in beverage bottling or container filling plants for dispensing a liquid product into bottles, cans or similar containers, including but not limited to filling processes that are carried out under counterpressure for the bottling of carbonated beverages. The apparatus designed to introduce a predetermined flow of liquid beverage filling material further comprises an apparatus that is designed to terminate the filling of the beverage bottles upon the liquid beverage filling material reaching the predetermined level in bottles. There may also be provided a conveyer arrangement that is designed to move bottles, for example, from an inspecting machine to the filling machine.

After a filling process has been completed, the filled beverage bottles are transported or conveyed to a closing machine, which is often a rotary closing machine. A revolving or rotary machine comprises a rotor, which revolves around a central, vertical machine axis. There may further be provided a conveyer arrangement configured to transfer filled bottles from the filling machine to the closing station. A transporting or conveying arrangement can utilize transport star wheels as well as linear conveyors. A closing machine closes bottles by applying a closure, such as a screw-top cap or a bottle cork, to a corresponding bottle mouth. Closed bottles are then usually conveyed to an information adding arrangement, wherein information, such as a product name or a manufacturer's information or logo, is applied to a bottle. A closing station and information adding arrangement may be connected by a corresponding conveyer arrangement. Bottles are then sorted and packaged for shipment out of the plant.

Many beverage bottling plants may also possibly comprise a rinsing arrangement or rinsing station to which new, non-return and/or even return bottles are fed, prior to being filled, by a conveyer arrangement, which can be a linear conveyor or a combination of a linear conveyor and a starwheel. Downstream of the rinsing arrangement or rinsing station, in the direction of travel, rinsed bottles are then transported to the beverage filling machine by a second conveyer arrangement that is formed, for example, by one or more starwheels that introduce bottles into the beverage filling machine.

It is a further possibility that a beverage bottling plant for filling bottles with a liquid beverage filling material can be controlled by a central control arrangement, which could be, for example, a computerized control system that monitors and controls the operation of the various stations and mechanisms of the beverage bottling plant.

Once beverage bottles are filled, closed, and packaged, the packages of filled beverage bottles may be placed on dollies and/or pallets for the transportation of the packages out of the beverage bottling plant.

Rolling transport systems are becoming increasingly important in merchandise handling and product logistics operations. These transport systems are rolling pallets which are also called dollies. These small dollies generally have a base surface which equals one-half or one-quarter of the size of a standard EU pallet, whereby of the four wheels or casters, one pair is conventionally realized in the form of steerable wheels which are mounted so that they can swivel around a vertical axis. The second pair of wheels or casters is not steerable. In reusable systems, the dollies are stacked on a Europallet and returned to the suppliers, where they are loaded with new products by the supplier. The loaded dollies are assembled on transport pallets, which are conventionally Europallets, fixed in position and shipped out to customers again.

In some rolling transport systems, an individually loaded dolly is transported by means of a transport bar which is provided with drivers. The disadvantages of a return system, however, include the fact that the dollies, which are generally stacked, are not oriented in the same direction and that the steerable wheels can be in any random direction. This situation requires and/or desires that the dollies and/or their steerable wheels be correctly oriented before or after the reloading, so that the loaded dollies can then be optimally grouped on a pallet.

OBJECT OR OBJECTS

An object of the present application is therefore to describe a device and a method in which the problems described above can be eliminated or overcome, restricted, and/or minimized.

SUMMARY

The present application relates to a method and an apparatus for the depalletizing and transport of dollies which have at least two steerable wheels mounted so that they can swivel around a vertical axis. The dollies are thereby delivered to a charging area by means of a lifting device such as an articulated arm robot, for example, removed from the pallet and/or unstacked if necessary and/or desired and then transferred to a transport or conveyor line which is adjacent to the charging area. During this process it is essential that the orientation of a dolly and/or its steerable wheels can be determined by at least one sensor such as a digital camera, for example, whereby the sensor is connected with a suitable computer-assisted evaluation unit, and the three-dimensional movement of the lifting device, which is generally an articulated arm robot, is then controlled as a function of the measurements recorded.

The present application teaches a method for the depalletizing and transport of dollies, whereby in a charging area, the dollies are delivered, removed from the pallets and/or unstacked if necessary and/or desierd by means of a lifting device, such as an articulated arm robot for example, and are then transferred to a transport or conveyor line. The orientation of a dolly and/or of the steerable wheels before they are placed on the transport and conveyor line are determined with at least one sensor which is connected with a suitable computer-assisted evaluation unit. The subsequent three-dimensional movement of the lifting device is controlled as a function of the measurements determined.

In at least one possible embodiment of the present application, the sensor device comprises one or more digital cameras, by means of which image data (real-time images) are recorded and compared in the computer-assisted evaluation unit with reference standards (reference images) or other specified data. On the basis of this comparison, the subsequent three-dimensional movement of the lifting device is controlled to achieve an optimum and uniform positioning and orientation of the dollies and their wheels on the transport or conveyor line.

In one improved variant method, if at least one of the steerable wheels is in an incorrect position or incorrect orientation, the dolly is tilted around a horizontal axis after it is lifted by the lifting device, so that the generally two steerable wheels are both above or below the fixed wheels, and the two steerable wheels are oriented identically or essentially identically by gravity. The angle of inclination $\alpha$ is in one possible embodiment thirty degrees to ninety degrees. The orientation of the wheels can be assisted by shaking and/or controlled acceleration sequences of the lifting device. The shaking and/or acceleration sequences are repeated as many times as necessary and/or desired. Then the dolly is placed on the transport and conveyor line. In at least one possible embodiment, a separate step or device is not necessary and/or may not be desired for the orientation of the steerable wheels, but this orientation or identical orientation occurs during the transfer of the dolly from the delivery area to the transport and conveyor line simultaneously or substantially simultaneously and without additional devices or tools. The dolly is also in one possible embodiment set down on the transport and conveyor line so that the steerable wheels are lower than the rigid wheels and are set down first. Then the dolly is tilted around the horizontal axis into the horizontal plane. When the dolly is set down, the angle of inclination $\alpha$ at the beginning of the tipping process into the horizontal plane is in one possible embodiment thirty degrees to sixty degrees.

Because the vertical bearings of the steerable wheels easily become dirty, as a result of which a swiveling movement by the force of gravity alone is sometimes impossible or at best incomplete, in one optimization of the present application, at least one guide element is provided on the transport and conveyor line, in which at least one of the steerable wheels is introduced into this guide element when the dolly is set down on the transport and conveyor line to correct any incorrect positioning or incomplete orientation of the steerable wheel.

For reasons of operational safety it is further possible to provide at least one position sensor in the area in which the dollies are set down after the transfer to the transport and conveyor line. In the event or a non-optimal positioning of the dolly on the transport and conveyor line and/or non-optimal orientation of one of the steerable wheels, an alarm message can be generated, for example, and the dolly and/or its steerable wheels can be re-oriented, or the process can be interrupted. In at least one possible embodiment, the at least one position sensor determines the position of the wheels of a dolly immediately or substantially immediately after it is set down on the transport and conveyor line, in one possible embodiment the position of the first two wheels.

The present application further comprises a device for the depalletizing and transport of dollies which includes a charging area for the delivery of dollies, which are generally stacked [and] at least one lifting device for the lifting and transfer of the dollies to an adjacent transport and conveyor line. In one possible embodiment, the device has at least one sensor and a computer-assisted unit, by means of which the orientation of the dollies and their steerable wheels in the delivery area is determined and the subsequent movements of the at least one lifting mechanism can be controlled and/or regulated for the optimum transport and positioning of the dollies on the transport and conveyor line. In one variant of the present application, the sensor can be an opto-electronic sensor, whereby it in one possible embodiment comprises one or more digital cameras. The lifting device is thereby in one possible embodiment a single-arm or articulated-arm robot which allows a smooth movement in three-dimensions.

An additional improvement is that a position sensor connected with the computer-assisted control unit is provided which determines the position of the wheels of a dolly immediately or substantially immediately after it is set down on the transport and conveyor line and transmits these measurements to the control unit for further processing. This position sensor can be located on or at the transport and conveyor line and determines the correct position of the wheels. The technician skilled in the art will be familiar with the many different types of sensors that are available. It is possible to use sensors that are located in the rail or the running surface itself and that determine the wheel position inductively or that function as a pressure sensor.

Alternatively, the position sensor can be located on or in the lifting device. The correct or incorrect positioning of the dolly and/or its steerable wheels is thereby determined on the basis of the final position reached by the lifting device. For this purpose, it can be possible if suitable stop edges and/or transmitters are provided on the transport and conveyor line which communicate directly or via the computer-assisted evaluation unit with the position sensor on or in the single-arm or articulated-arm robot.

In one improved variant, at least one guide element is provided on the transport and conveyor line, into which guide element at least one of the steerable wheels can be introduced when the dolly is set down on the transport and conveyor line, whereby in at least one possible embodiment one guide element is provided for each steerable wheel. Any incorrect position of the steerable wheels can thereby be corrected and the placement of the dollies can be facilitated. Many different guide elements are available to the technician skilled in the art for this purpose. One possible embodiment of such a guide element points upward beyond the rail or the running surface of the transport and conveyor line, and has funnel-shaped side walls which are inclined outward. The steerable wheels are guided and oriented by the funnel shape. In one improved variant, the guide elements can be retracted so that they cannot get caught on the dolly after a dolly is set down and while it is being transported.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

Figure 1:
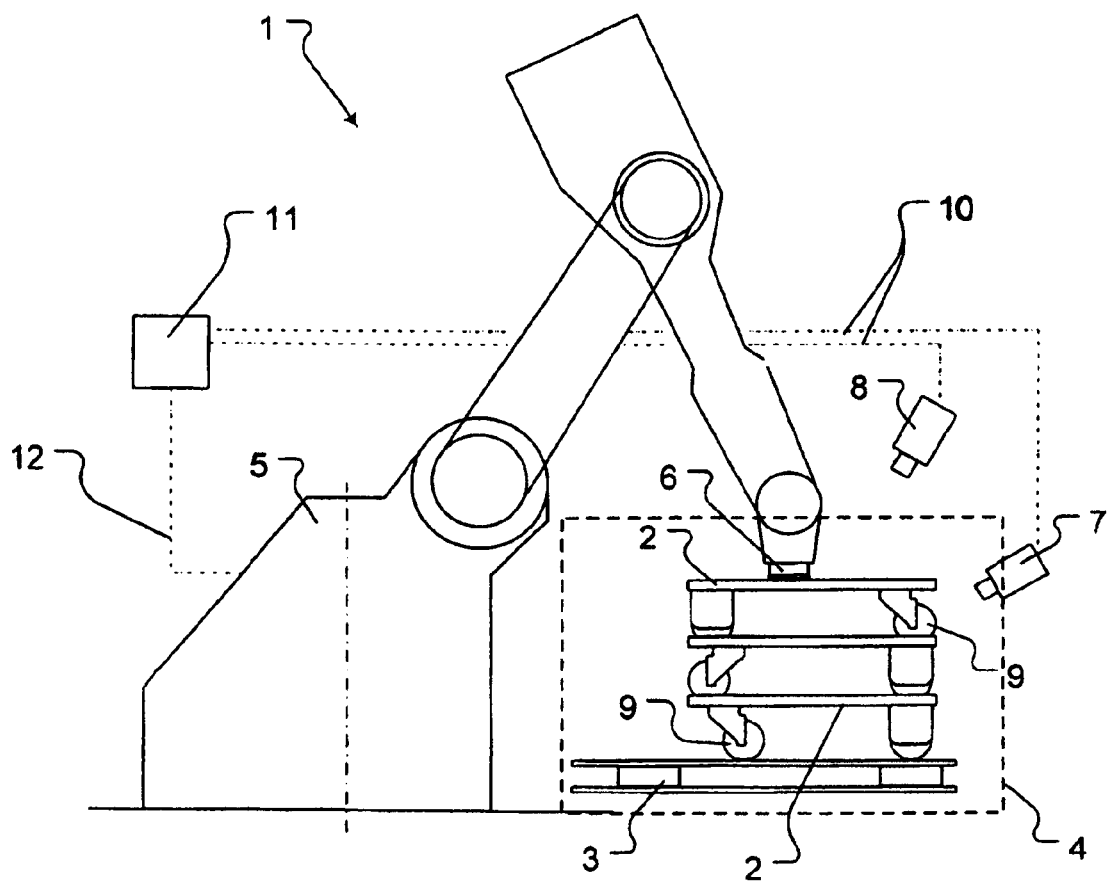
FIG. 1 shows by way of example the device for the depalletizing and transport of dollies.
Figure 1A:
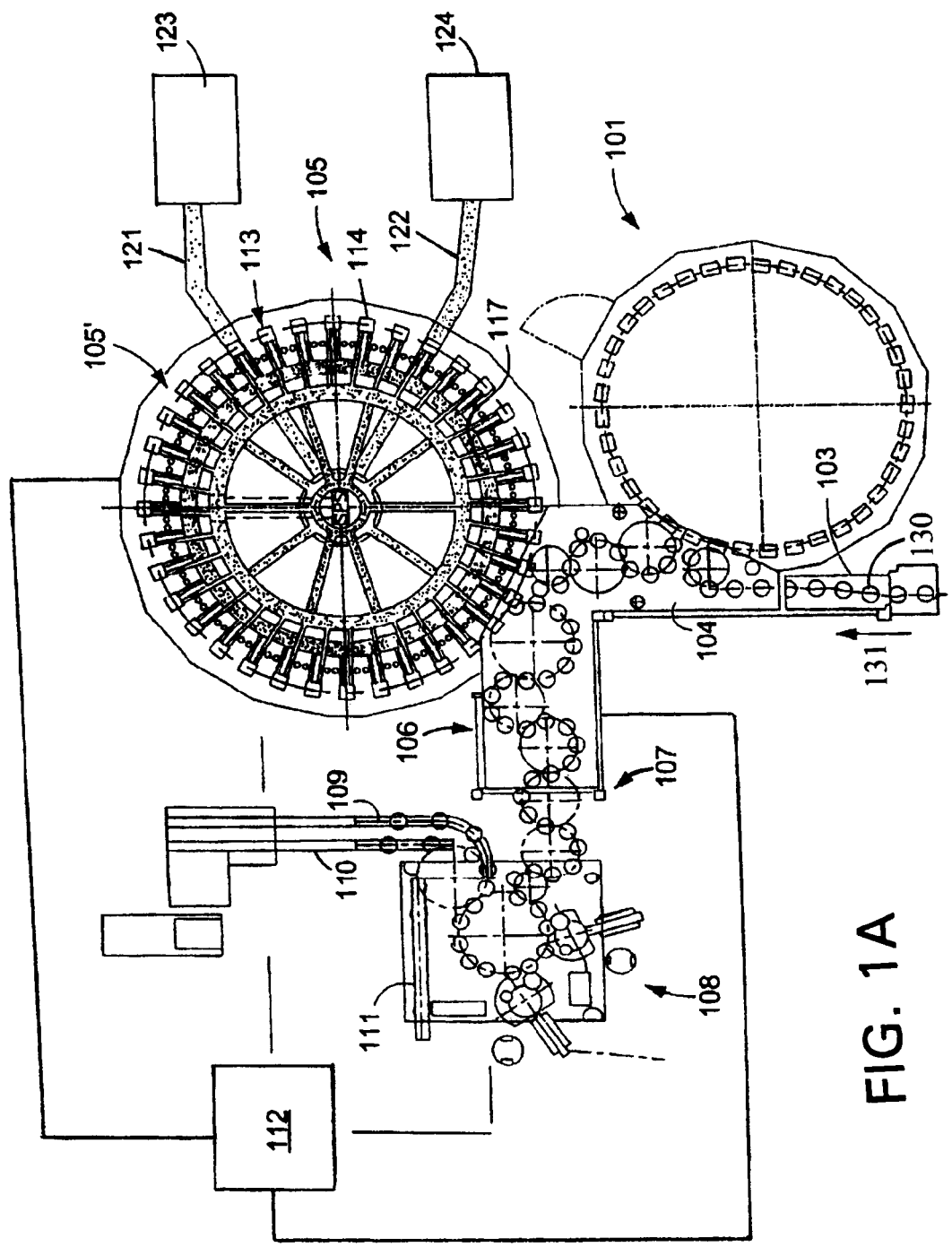
FIG. 1A shows schematically the main components of one possible embodiment example of a system for filling containers, for example a beverage bottling plant for filling bottles with at least one liquid beverage, in accordance with at least one possible embodiment, in which system or plant could possibly be utilized at least one aspect, or several aspects, of the embodiments disclosed herein.

FIG. 1A shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 1A shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 1A, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124.

The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

FIG. 1 shows the device, which is designated 1 in general, for the depalletizing and transport of dollies during the picking up of a first dolly 2 which is on the top of a stack of a plurality of dollies. The stack itself is carried by a pallet 3. The dollies 2 and the pallet 3 are located in the charging area 4. The articulated-arm robot 5 picks up the top dolly 2 using a gripper tool 6 which is not illustrated in further detail. The orientation of the dolly 2 and of the steerable wheels 9 is determined by means of digital cameras 7 and 8 and the real-time images are transmitted by means of the data line 10 to the computer-assisted evaluation unit 11, where they are evaluated and the articulated-arm robot 12 is then controlled via the data line 12. Naturally the data lines 10 and 12 can be replaced by a wireless transmission path. In the illustrated example, the digital camera 7 determines the orientation of the steerable wheels 9 and the digital camera 8 determines the orientation and position of the dolly 2 itself.

Figure 2:
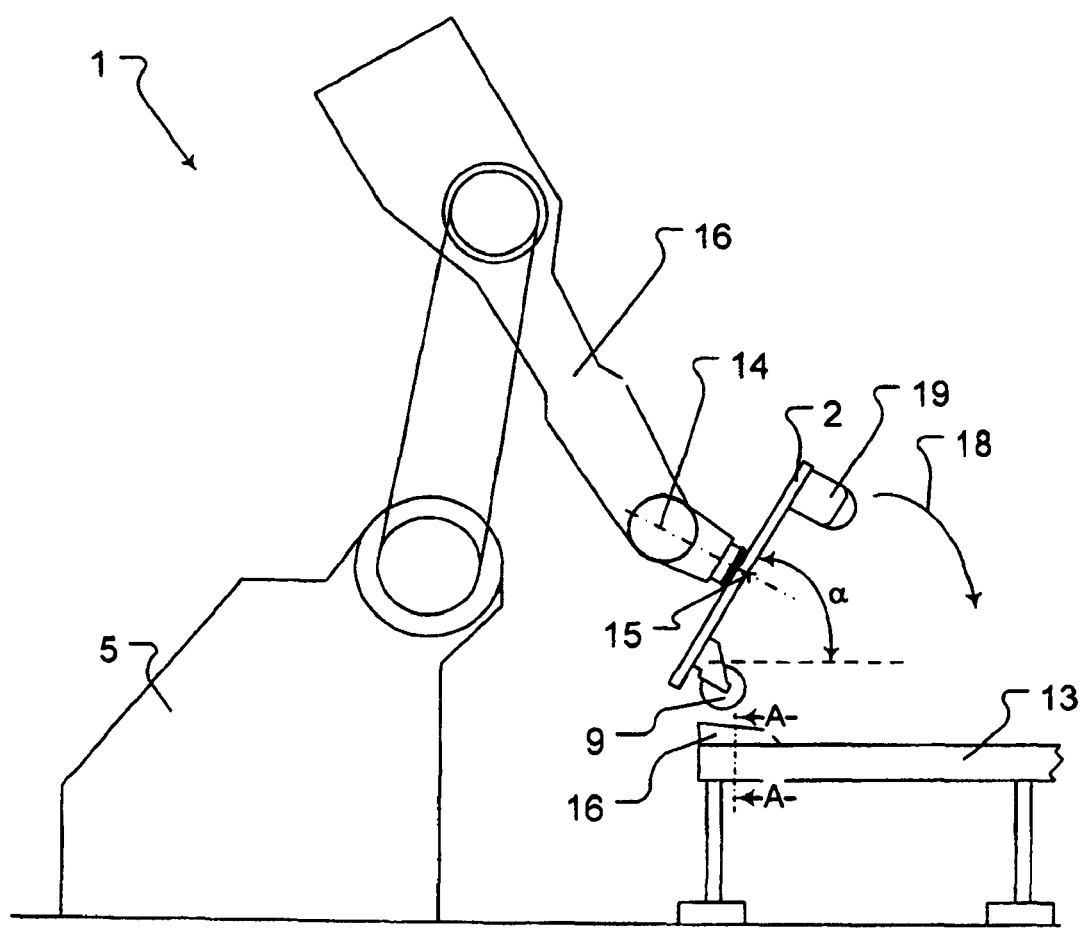
FIG. 2 shows by way of example the device for the depalletizing and transport of dollies.

FIG. 2 shows the process of setting the dolly 2 down on the transport and conveyor line 13. As the dolly 2 is lifted up from the charging area, it is swiveled around the axis 14 and tilted by the angle α around the axis 15. The axis 15 in FIG. 2 is perpendicular or substantially perpendicular to the plane of the drawing and is indicated by a small X. When the dolly 2 is set down on the transport and conveyor line 13, the dolly 2 descends in the direction indicated by the arrow 18 and simultaneously or substantially simultaneously executes a tilting movement in the direction indicted by the arrow 18. The fixed wheels 19 are set down after the steerable wheels 9, whereby the steerable wheels 9 are adjusted and guided in the guide element 20.

Figure 3:
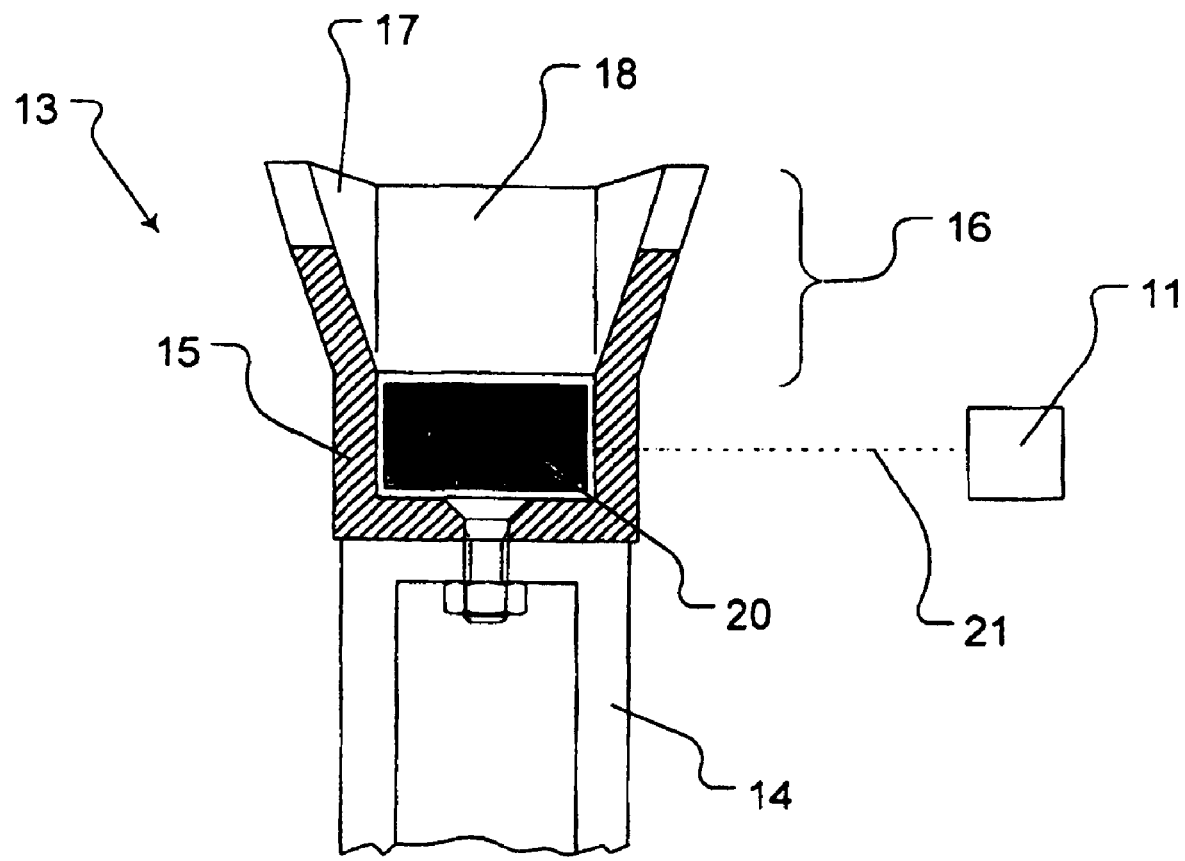
FIG. 3 is a sectional drawing which shows the guide element in detail.

FIG. 3 shows a section through a rail of the transport and guide track 13, along the section line AA (FIG. 2), whereby the transport and conveyor line 13 comprises two rails that are constructed essentially identically and on which the dollies are guided and transported on both sides. The transport and conveyor line 13 has support feet 14 and rails 15 that are oriented essentially horizontally. In the section AA shown, the rail 15 transitions seamlessly into the guide element 16, of which the two outwardly inclined side pieces 17 and the rear wall 18 are shown. The rear wall 18 is divided into two sections, one of which is vertical and the other of which is inclined toward the rear. A position sensor 20 is installed in the vertical section of the rear wall 18. An incorrect position of the steerable wheel 9 is detected inductively if the two steerable wheels 9 do not come into contact with the position sensors 20 at the beginning of the lowering of the dolly 9 onto the transport and conveyor line. This information is transmitted via the data line 21 to the computer-assisted control unit 11 where it is processed.

The present application relates to a method and a device for the depalletizing and transport of dollies which have at least two steerable wheels which are mounted so that they can swivel around a vertical axis. The dollies are delivered to a charging area, removed if necessary and/or desired from the pallet by means of a lifting device such as an articulated-arm, for example, and/or unstacked and then transferred to a transport or conveyor line which is adjacent to the charging area. It is thereby essential that the orientation of a dolly and/or of its steerable wheels are determined by means of at least one sensor such as a digital camera, for example, before it is set down on the transport and conveyor line, whereby the sensor is connected with a suitable computer-assisted evaluation unit, and the three-dimensional movement of the lifting device is then controlled as a function of the measurements that are determined.

One feature or aspect of an embodiment is believed at the time of the filing of this patent application to possibly reside broadly in a method for the depalletizing and transport of dollies which have at least two steerable wheels which are mounted so that they can swivel around a vertical axis, whereby the dollies are delivered to a charging area, removed if necessary and/or desired from the pallet by means of a lifting device such as an articulated-arm robot, for example, and/or unstacked and then transferred to a transport or conveyor line which is adjacent to the charging area, wherein the orientation of a dolly and/or of its steerable wheels before it is set down on the transport and conveyor line is determined with at least one sensor which is connected with a suitable computer-assisted evaluation unit, whereby the three-dimensional movement of the lifting device is then controlled as a function of the measurements determined.

Another feature or aspect of an embodiment is believed at the time of the filing of this patent application to possibly reside broadly in the method, wherein at least one sensor device is a digital camera, and the image data (real-time images) recorded are compared in the computer-assisted evaluation unit with standards (reference images), and the three-dimensional movement of the at least one lifting device is controlled and/or regulated to achieve an optimum and uniform positioning and orientation of the dollies and their wheels on the transport or conveyor line.

Yet another feature or aspect of an embodiment is believed at the time of the filing of this patent application to possibly reside broadly in the method, wherein in the event of an incorrect position or incorrect orientation of at least one of the steerable wheels, the dolly is tilted around a horizontal axis after it has been lifted by the lifting device so that the at least two steerable wheels are oriented identically or essentially identically by gravity, and the dolly is then set down on the transport or conveyor line.

Still another feature or aspect of an embodiment is believed at the time of the filing of this patent application to possibly reside broadly in the method, wherein the angle of inclination α is thirty degrees to ninety degrees, and is thirty degrees to sixty degrees when the dolly is set down on the transport and conveyor line.

A further feature or aspect of an embodiment is believed at the time of the filing of this patent application to possibly reside broadly in the method, wherein the lifting device for the orientation of the wheels executes shaking movements and/or controlled acceleration sequences.

Another feature or aspect of an embodiment is believed at the time of the filing of this patent application to possibly reside broadly in the method, wherein the transport and conveyor line has at least one guide element into which at least one of the steerable wheels is introduced when the dolly is placed on the transport and conveyor line to correct any incorrect position of the steerable wheel.

Yet another feature or aspect of an embodiment is believed at the time of the filing of this patent application to possibly reside broadly in the method, wherein in the area in which the dollies are set down after the transfer on the transport and conveyor line, at least one position sensor is provided, so that in the event of a non-optimal positioning of the dolly on the transport and conveyor line and/or a non-optimal orientation of one of the steerable wheels, an alarm message is generated, so that the dolly and/or its steerable wheels can be reoriented or the process can be interrupted.

Still another feature or aspect of an embodiment is believed at the time of the filing of this patent application to possibly reside broadly in the method, wherein the at least one position sensor determines the position of the wheels of a dolly immediately or substantially immediately after the dolly is set down on the transport and conveyor line.

A further feature or aspect of an embodiment is believed at the time of the filing of this patent application to possibly reside broadly in a device for the depalletizing and transport of dollies which have at least two steerable wheels which are mounted so that they can swivel around a vertical axis, comprising a charging area for the delivery of generally stacked dollies [and] at least one lifting device for the lifting and transfer of the dollies to an adjacent transport and conveyor line, wherein it comprises at least one sensor and one computer-assisted unit, by means of which the orientation of the dollies and their steerable wheels in the delivery area is determined, and the subsequent movements of the at least one lifting mechanism can be controlled and/or regulated for the optimal transfer and positioning of the dollies on the transport and conveyor line.

Another feature or aspect of an embodiment is believed at the time of the filing of this patent application to possibly reside broadly in the device, wherein the sensor is an optoelectronic sensor and in one possible embodiment a digital camera.

Yet another feature or aspect of an embodiment is believed at the time of the filing of this patent application to possibly reside broadly in the device, wherein the lifting device is an articulated-arm robot.

Still another feature or aspect of an embodiment is believed at the time of the filing of this patent application to possibly reside broadly in the device, wherein at last one position sensor connected with the computer-assisted control unit is provided which determines the position of the wheels of a dolly immediately or substantially immediately after it is set down on the transport and conveyor line, and these measurements can be transmitted to the control unit for further processing.

A further feature or aspect of an embodiment is believed at the time of the filing of this patent application to possibly reside broadly in the device, wherein the at least one position sensor is located on or at the transport and conveyor line and determines the correct position of the wheels.

One feature or aspect of an embodiment is believed at the time of the filing of this patent application to possibly reside broadly in the device, wherein the at least one position sensor is located on or in the lifting device, whereby the correct or incorrect positioning of the dolly and/or of its steerable wheels on the transport and conveyor line is determined from the final position reached by the lifting device, for which purpose appropriate stop edges and/or transmitters can be provided on the transport and conveyor line.

Another feature or aspect of an embodiment is believed at the time of the filing of this patent application to possibly reside broadly in the device, wherein at least one guide element is provided on the transport and conveyor line, into which guide element at least one of the steerable wheels can be introduced when the dolly is set down on the transport and conveyor line to correct any incorrect position of the steerable wheel.

Yet another feature or aspect of an embodiment is believed at the time of the filing of this patent application to possibly reside broadly in the device, wherein this guide element projects upward beyond the rail or surface of the transport and conveyor line, and has side walls that are inclined outward in the shape of a funnel, which side walls are closer together toward the bottom in the direction of the rail or running surface.

Still another feature or aspect of an embodiment is believed at the time of the filing of this patent application to possibly reside broadly in the device, wherein the guide element can be retracted.

A further feature or aspect of an embodiment is believed at the time of the filing of this patent application to possibly reside broadly in a method of operating a beverage bottling plant, which beverage bottling plant is configured to fill, close, and package beverage bottles, said method comprising the steps of: filling beverage bottles with liquid beverage material in a beverage bottle filling machine; closing filled beverage bottles in a beverage bottle closing machine; packaging closed, filled beverage bottles in a beverage bottle packaging machine; transporting a stack of dollies on a pallet to an unloading area, in which unloading area the dollies are unstacked; gripping a first dolly with a gripper arm, which first dolly is disposed on top of said stack of dollies on a pallet in said unloading area; lifting said first dolly with said gripper arm and unstacking said first dolly from said stack of dollies; sensing the orientation and position of said first dolly with at least a first camera; sensing the orientation of the wheels on said first dolly with at least a second camera; sending information regarding the sensed orientation and position of said first dolly, from said at least a first camera, to a control arrangement; sending information regarding the sense orientation of the wheels on said first dolly, from said at a second camera, to said control arrangement; comparing said sent information to desired orientations and positions stored in said control arrangement; determining the orientation and position of said first dolly and the orientation of said wheels on said first dolly with said control arrangement through said comparison of said sent information to said desired orientations and positions stored in said control arrangement; tilting said first dolly at an angle with respect to the surface of a conveyor to permit a set of steerable wheels to be oriented by gravity; swiveling said first dolly around an axis of rotation and orienting said first dolly in a predetermined orientation, in which predetermined orientation a set of fixed wheels precedes said set of steerable wheels in a direction of transport; transporting said oriented first dolly to a conveyor in said predetermined orientation, with said set of fixed wheels preceding said set of steerable wheels in said direction of transport; loading said first dolly with packages of closed, filled beverage bottles; and loading said loaded first dolly on a pallet.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

The following patents, patent applications or patent publications, are hereby incorporated by reference as if set forth in their entirety herein: DE 0 251 439 A2; EP 1 149 753 A2, having the following English translation of the German title "Transport cart," published on Oct. 31, 2001; DE 34 42 111 C2, having the following English translation of the German title "Apparatus for manipulating rolling pallettes in shelving," published on Jul. 10, 1986; and EP 0 251 439, having the title "Plastic dolly," published on Jan. 7, 1988.

All of the patents, patent applications or patent publications, which were cited in the International Search Report dated Sep. 10, 2008, and/or cited elsewhere are hereby incorporated by reference as if set forth in their entirety herein as follows: U.S. Pat. No. 4,815,916, having the title "APPARATUS FOR RAISING A MAGNETIZABLE OBJECT FROM A STACK AND MOVING IT AWAY FOR FURTHER PROCESSING," published on Mar. 28, 1989; WO 00/51898, having the title "TRANSPORTATION MEANS," published on Sep. 8, 2000; and JP 2003 136905, having the following English translation of the Japanese title "WHEEL BODY, MOVING BODY AND WHEEL BODY MANUFACTURING METHOD," published on May 14, 2003.

All of the patents, patent applications or patent publications, which were cited in the German Office Action dated Jan. 14, 2008, and/or cited elsewhere are hereby incorporated by reference as if set forth in their entirety herein as follows: U.S. Pat. No. 2,723,770, having the title "DEVICE FOR THE STORAGE OF PIECE GOODS," published on Nov. 15, 1955; and DE 32 44 231, having the following English translation of the German title "DUAL RAILS FOR ROLLER PALLETS," published on Jun. 9, 1983.

Some examples of position sensors or position sensor systems that may be used or adapted for use in at least one possible embodiment of the present invention may be found in the following U.S. patents: U.S. Pat. No. 5,794,355, issued to inventor Nickum on Aug. 18, 1998; U.S. Pat. No. 5,520,290, issued to inventors Kumar et al. on May 28, 1996; U.S. Pat. No. 5,074,053, issued to inventor West on Dec. 24, 1991; and U.S. Pat. No. 4,087,012, issued to inventor Fogg on May 2, 1978.

Some examples of cameras or the like optical monitoring apparatus that may possibly be utilized or possibly adapted for use in at least one possible embodiment of the present application may possibly be found in the following U.S. patents: U.S. Pat. No. 5,233,186 issued to Ringlien on Aug. 3, 1993; U.S. Pat. No. 5,243,400 issued to Ringlien on Sep. 7, 1993; U.S. Pat. No. 5,369,713 issued to Schwartz et al. on Nov. 29, 1994; U.S. Pat. No. 5,442,446 issued to Gerber et al. on Aug. 15, 1995; U.S. Pat. No. 5,661,295 issued to Buchmann et al. on Aug. 26, 1997; and U.S. Pat. No. 5,898,169 issued to Nodbryhn on Apr. 27, 1999.

Some examples of rotation sensors that may possibly be utilized or possibly adapted for use in at least one possible embodiment of the present application may possibly be found in the following U.S. patents: U.S. Pat. No. 6,246,232 issued to Okamura on Jun. 12, 2001; U.S. Pat. No. 6,448,761 issued to Stumpe on Sep. 10, 2002; U.S. Pat. No. 6,474,162 to Voss et al. on Nov. 5, 2002; U.S. Pat. No. 6,498,481 issued to Apel on Dec. 24, 2002; U.S. Pat. No. 6,532,831 issued to Jin et al. on Mar. 18, 2003; and U.S. Pat. No. 6,672,175 issued to Jin et al. on Jan. 6, 2004.

U.S. patent application Ser. No. 12/570,748, having Attorney Docket No. NHL-HOL-264A, having the title "LOADING AND PALLETIZING DEVICE FOR ROLL TRUCKS, SUCH AS DOLLIES, AND THE ASSOCIATED METHOD," and filed on Sep. 30, 2009, is herein incorporated by reference as if set forth in its entirety.

Some examples of depalletizers and/or methods for depalletizing, which may possibly be utilized or adapted for use with at least one possible embodiment of the present application, may possibly be found in the following U.S. patents: U.S. Pat. No. 6,379,106, having the title "Depalletizing machine," published on Apr. 30, 2002; U.S. Pat. No. 6,332,750, having the title "Method and apparatus for depalletizing commodities," published on Dec. 25, 2001; U.S. Pat. No. 6,089,819, having the title "Method and apparatus for palletizing and depalletizing layers of articles on stackable pallets," published on Jul. 18, 2000; U.S. Pat. No. 5,913,655, having the title "Automatic depalletizing system and method," published on Jun. 22, 1999; U.S. Pat. No. 5,310,307, having the title "Depalletizing device and method," published on May 10, 1994; U.S. Pat. No. 4,109,802, having the title "Depalletizing apparatus," published on Aug. 29, 1978; and U.S. Pat. No. 4,106,635, having the title "Elevatable depalletizing system," published on Aug. 15, 1978.

Some examples of palletizers and/or methods of palletizing, which may possibly be utilized or adapted for use with at least one possible embodiment of the present application, may possibly be found in the following U.S. patents: U.S. Pat. No. 6,817,829, having the title "Work loading method for automatic palletizer, work loading method, work loading apparatus and attachment replacing method thereof," published on Nov. 16, 2004; U.S. Pat. No. 6,658,816, having the title "Bulk palletizer system," published on Dec. 9, 2003; U.S. Pat. No. 5,961,275, having the title "Palletizer and palletizing methods," published on Oct. 5, 1999; U.S. Pat. No. 5,525,029, having the title "Palletizer having vertically movable pallet supports and at least one gripper only in a horizontal plane," published on Jun. 11, 1996; U.S. Pat. No. 5,395,209, having the title "Palletizer," published on Mar. 7, 1995; and U.S. Pat. No. 5,261,781, having the title "Nov. 12, 1993.

Some examples of methods and apparatus for loading dollies or similar arrangements, which may possibly be utilized or adapted for use with at least one possible embodiment of the present application, may possibly be found in the following U.S. patents: U.S. Pat. No. 6,698,990, having the title "Loading and unloading installation for general cargo, especially for ISO containers," published on Mar. 2, 2004; U.S. Pat. No. 7,427,185, having the title "Method and apparatus for loading stacks of cartons of frozen animal products onto vessels using a carrier," published on Sep. 23, 2008; and U.S. Pat. No. 6,537,015, having the title "Container loading and unloading apparatus," published on Mar. 25, 2003.

The patents, patent applications, and patent publication listed above in the preceding ten paragraphs are herein incorporated by reference as if set forth in their entirety. The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2007 022 686.3, filed on May 11, 2007, having inventor Joachim JUNGHANS, and DE-OS 10 2007 022 686.3 and DE-PS 10 2007 022 686.3, and International Application No. PCT/EP2008/003544, filed on May 2, 2008, having WIPO Publication No. WO 2008/138500 and inventor Joachim JUNGHANS, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the corresponding foreign equivalent patent application(s), that is, PCT/EP2008/003544 and German Patent Application 10 2007 022 686.3, is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2008/003544 and DE 10 2007 022 686.3 from which this patent application claims priority which do not have to do with the correction of the translation in this patent application are not to be included in this patent application in the incorporation by reference.

Any statements about admissions of prior art in the original foreign patent applications PCT/EP2008/003544 and DE 10 2007 022 686.3 are not to be included in this patent application in the incorporation by reference, since the laws relating to prior art in non-U.S. Patent Offices and courts may be substantially different from the Patent Laws of the United States.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of operating a beverage bottling plant, which beverage bottling plant is configured to fill, close, and package beverage bottles, said method comprising the steps of:
   filling beverage bottles with liquid beverage material in a beverage bottle filling machine;
   closing filled beverage bottles in a beverage bottle closing machine;
   packaging closed, filled beverage bottles in a beverage bottle packaging machine;
   transporting a stack of dollies on a pallet to an unloading area, in which unloading area the dollies are unstacked;
   gripping a first dolly with a gripper arm, which first dolly is disposed on top of said stack of dollies on a pallet in said unloading area;
   lifting said first dolly with said gripper arm and unstacking said first dolly from said stack of dollies;
   sensing the orientation and position of said first dolly with at least a first camera;
   sensing the orientation of the wheels on said first dolly with at least a second camera;
   sending information regarding the sensed orientation and position of said first dolly, from said at least a first camera, to a control arrangement;
   sending information regarding the sense orientation of the wheels on said first dolly, from said at a second camera, to said control arrangement;
   comparing said sent information to desired orientations and positions stored in said control arrangement;
   determining the orientation and position of said first dolly and the orientation of said wheels on said first dolly with said control arrangement through said comparison of said sent information to said desired orientations and positions stored in said control arrangement;
   tilting said first dolly at an angle with respect to the surface of a conveyor to permit a set of steerable wheels to be oriented by gravity;
   swiveling said first dolly around an axis of rotation and orienting said first dolly in a predetermined orientation, in which predetermined orientation a set of fixed wheels precedes said set of steerable wheels in a direction of transport;
   transporting said oriented first dolly to a conveyor in said predetermined orientation, with said set of fixed wheels preceding said set of steerable wheels in said direction of transport;
   loading said first dolly with packages of closed, filled beverage bottles; and
   loading said loaded first dolly on a pallet.

2. Method for the depalletizing and transport of dollies which have at least two steerable wheels which are mounted so that they can swivel around a vertical axis, whereby the dollies are delivered to a charging area, removed if necessary from the pallet by means of a lifting device such as an articulated-arm robot, for example, and/or unstacked and then transferred to a transport or conveyor line which is adjacent to the charging area, characterized in that the orientation of a dolly and/or of its steerable wheels before it is set down on the transport and conveyor line is determined with at least one sensor which is connected with a suitable computer-assisted evaluation unit, whereby the three-dimensional movement of the lifting device is then controlled as a function of the measurements determined.

3. Method as recited in claim 2, characterized in that at least one sensor device is a digital camera, and the image data (real-time images) recorded are compared in the computer-assisted evaluation unit with standards (reference images), and the three-dimensional movement of the at least one lifting device is controlled and/or regulated to achieve an optimum and uniform positioning and orientation of the dollies and their wheels on the transport or conveyor line.

4. Method as recited in claim 3, characterized in that in the event of an incorrect position or incorrect orientation of at least one of the steerable wheels, the dolly is tilted around a horizontal axis after it has been lifted by the lifting device so that the at least two steerable wheels are oriented identically or essentially identically by gravity, and the dolly is then set down on the transport or conveyor line.

5. Method as recited in claim 4, characterized in that the angle of inclination α is 30° to 90°, and is 30° to 60° when the dolly is set down on the transport and conveyor line.

6. Method as recited in claim 5, characterized in that the lifting device for the orientation of the wheels executes shaking movements and/or controlled acceleration sequences.

7. Method as recited in claim 6, characterized in that the transport and conveyor line has at least one guide element into which at least one of the steerable wheels is introduced when the dolly is placed on the transport and conveyor line to correct any incorrect position of the steerable wheel.

8. Method as recited in claim 7, characterized in that in the area in which the dollies are set down after the transfer on the transport and conveyor line, at least one position sensor is provided, so that in the event of a non-optimal positioning of the dolly on the transport and conveyor line and/or a non-optimal orientation of one of the steerable wheels, an alarm message is generated, so that the dolly and/or its steerable wheels can be reoriented or the process can be interrupted.

9. Method as recited in claim 8, characterized in that the at least one position sensor determines the position of the wheels of a dolly immediately after the dolly is set down on the transport and conveyor line.

10. Device for the depalletizing and transport of dollies which have at least two steerable wheels which are mounted so that they can swivel around a vertical axis, comprising a charging area for the delivery of generally stacked dollies [and] at least one lifting device for the lifting and transfer of the dollies to an adjacent transport and conveyor line, characterized in that it comprises at least one sensor and one computer-assisted unit, by means of which the orientation of the dollies and their steerable wheels in the delivery area is determined, and the subsequent movements of the at least one lifting mechanism can be controlled and/or regulated for the optimal transfer and positioning of the dollies on the transport and conveyor line.

11. Device as recited in claim 10, characterized in that the sensor is an opto-electronic sensor and ideally a digital camera.

12. Device as recited in claim 11, characterized in that the lifting device is an articulated-arm robot.

13. Device as recited in claim 12, characterized in that at last one position sensor connected with the computer-assisted control unit is provided which determines the position of the wheels of a dolly immediately after it is set down on the transport and conveyor line, and these measurements can be transmitted to the control unit for further processing.

14. Device as recited in claim 13, characterized in that the at least one position sensor is located on or at the transport and conveyor line and determines the correct position of the wheels.

15. Device as recited in claim 14, characterized in that the at least one position sensor is located on or in the lifting device, whereby the correct or incorrect positioning of the dolly and/or of its steerable wheels on the transport and conveyor line is determined from the final position reached by the lifting device, for which purpose appropriate stop edges and/or transmitters can be provided on the transport and conveyor line.

16. Device as recited in claim 15, characterized in that at least one guide element is provided on the transport and conveyor line, into which guide element at least one of the steerable wheels can be introduced when the dolly is set down on the transport and conveyor line to correct any incorrect position of the steerable wheel.

17. Device as recited in claim 16, characterized in that this guide element projects upward beyond the rail or surface of the transport and conveyor line, and has side walls that are inclined outward in the shape of a funnel, which side walls are closer together toward the bottom in the direction of the rail or running surface.

18. Device as recited in claim 17, characterized in that the guide element can be retracted.

* * * * *